No. 726,147. PATENTED APR. 21, 1903.
K. DODGE.
SUPPORT FOR COILED WIRE.
APPLICATION FILED FEB. 21, 1903.
NO MODEL.

Witnesses:-
Titus H Jones.
Hamilton D Turner

Inventor:-
Kern Dodge,
by his Attorneys

UNITED STATES PATENT OFFICE.

KERN DODGE, OF PHILADELPHIA, PENNSYLVANIA.

SUPPORT FOR COILED WIRE.

SPECIFICATION forming part of Letters Patent No. 726,147, dated April 21, 1903.

Application filed February 21, 1903. Serial No. 144,492. (No model.)

*To all whom it may concern:*

Be it known that I, KERN DODGE, a citizen of the United States, residing in Philadelphia, Pennsylvania, have invented certain Improvements in Supports for Coiled Wire, of which the following is a specification.

The object of my invention is to provide a support which will properly hold coiled wire in position when it is highly heated.

My invention is especially applicable for supporting electric wires in the form of coils used as resistance or induction coils which become highly heated when an electric current is passing through them. The object I attain in the following manner, reference being had to the accompanying drawings, in which—

Figure 1:
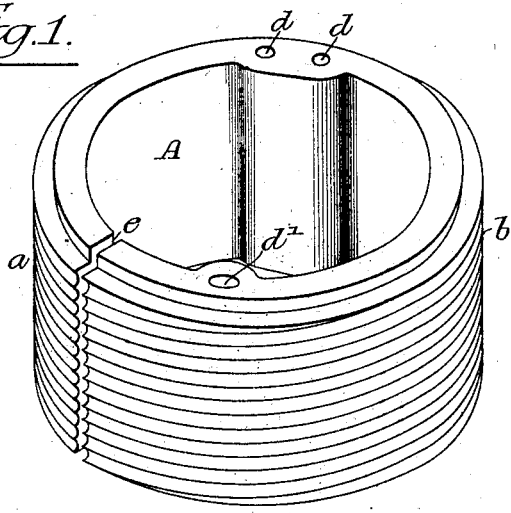
Figure 2:
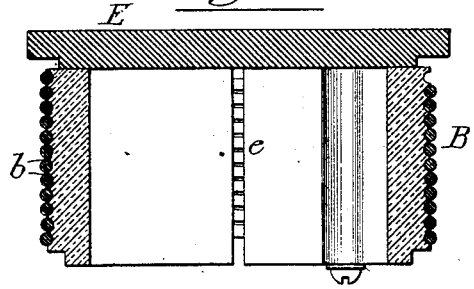
Figure 3:
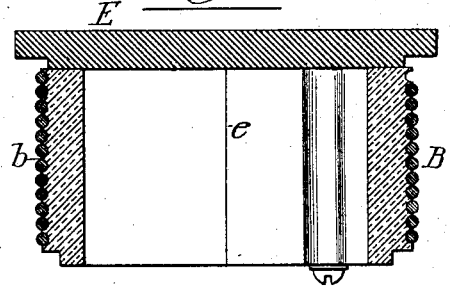
Figure 4:
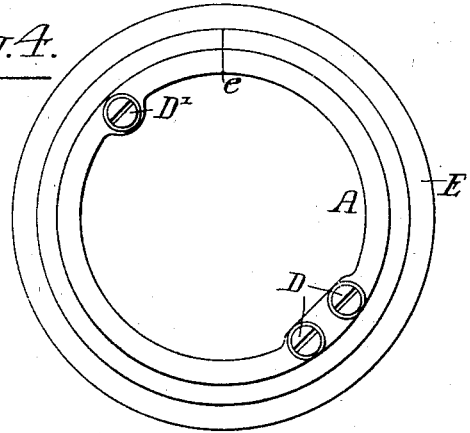

Figure 1 is a perspective view of my improved coiled-wire support. Fig. 2 is a sectional view showing the support expanded. Fig. 3 is a view showing it contracted, and Fig. 4 is an inverted plan view of Fig. 3.

The supports now used are made of porcelain or other non-conducting material and are rigid, and the wire is coiled on the support. The ribs on the support tend to hold the coils of wire a sufficient distance apart; but when the wire becomes heated by the passage of an electric current through it the coils expand, and the wire being hot falls away from the support and short-circuits.

By my invention I provide a yielding support for the wire which will expand and contract with the coil of wire.

A is the support, made of porcelain or other non-conducting material in the present instance and having a spiral groove $a$ on its periphery, forming a rib $b$. The size and shape of the groove will depend upon the size of the wire used. The rib must extend sufficient to prevent one coil of the wire coming in contact with another.

The support is open at the center in the present instance and has a slot $e$ cut entirely through the wall, so as to allow the support to expand or contract. The support is so proportioned that the two edges of the slot can be drawn toward each other without cracking the porcelain when the wire is coiled upon the support, and the porcelain has sufficient spring in it to take up any slack in the coil when the wire expands, due to the heat generated by the electric current passing through the wire.

The support can be secured to a base E in any suitable manner. In the present instance I have shown two vertical holes $d\ d$ in one side of the support, through which pass bolts D D, which secure the support to the base. I may use, in addition to these bolts, a bolt D', which passes through an oblong opening $d'$ in the opposite wall of the support, the oblong hole being formed to allow for the expansion and contraction of the support.

The bolts D D are turned so as to rigidly secure the support to the base; but the bolt D' may be backed off a trifle to allow the support to expand or contract.

When the wire B (shown in Figs. 2 and 3) is coiled upon the support, sufficient tension is applied to close or partly close the slot $e$, as shown in Figs. 3 and 4; but when the current is passed through the wire and it becomes hot the wire will expand, and the support will be free to expand with it, as shown in Fig. 2. Thus the wire is held in proper coiled position upon the support under all conditions.

I claim as my invention—

1. A support for coiled wire capable of contracting or expanding with the coiled wire so as to hold the wire in proper coiled position under all conditions, substantially as described.

2. A cylindrical support for coiled wire having a spiral groove in its periphery for the reception of the wire and slotted to allow it to expand and contract with the wire, substantially as described.

3. The combination of a cylindrical support of non-conducting material having a spiral groove in its periphery and slotted, with means for rigidly securing the support to the base at one point, substantially as described.

4. A support for coiled wire consisting of a cylinder of non-conducting material having a spiral groove in its periphery and slotted to allow the support to expand and contract and having two longitudinal holes on one side and an oblong hole on the opposite side for the reception of securing-bolts, substantially as described.

In testimony whereof I have signed my name to this specification in the presence of two subscribing witnesses.

KERN DODGE.

Witnesses:
WILL. A. BARR,
JOS. H. KLEIN.